United States Patent [19]
Odegaard

[11] 3,933,309
[45] Jan. 20, 1976

[54] SPRAY BOOM

[76] Inventor: Robert J. Odegaard, R. R. 1, Box 1, Kindred, N. Dak. 58051

[22] Filed: Jan. 14, 1975

[21] Appl. No.: 540,896

[52] U.S. Cl. ................. 239/171; 244/136; 239/549
[51] Int. Cl.² ...................... B05B 17/02; B64D 1/18
[58] Field of Search................... 239/549, 171, 560; 244/136

[56] References Cited
UNITED STATES PATENTS

| | | | |
|---|---|---|---|
| 1,584,945 | 5/1926 | Johnson | 244/136 |
| 2,504,580 | 4/1950 | Pierson | 239/171 |
| 2,976,647 | 3/1961 | Pickrell | 239/549 |
| 3,442,334 | 5/1969 | Gousetis | 239/171 |
| 3,445,065 | 5/1969 | Waldrum | 239/171 |
| 3,495,793 | 2/1970 | Barlow | 239/171 |
| 3,603,506 | 9/1971 | Hubbs | 239/171 |
| 3,762,649 | 10/1973 | Dalhaus | 239/171 |

Primary Examiner—Lloyd L. King
Attorney, Agent, or Firm—Burd, Braddock & Bartz

[57] ABSTRACT

A spray boom for aircraft involving an elongate reservoir having the exterior shape of an air foil designed to minimize drag and assist in the lifting of the aircraft. The reservoir is interiorly divided into a plurality of separate compartments, each of which is sealed from one another and each of which is capable of handling a different type of material such as liquids, powders, granules, or even gases, if so desired. These compartments extend the full length of the boom and each of the compartments is provided with its own discharge nozzle whereby the contents of each or any of the compartments can be individually discharged therefrom along the entire length of the boom so that the contents of each compartment can be sprayed across the entire spray pattern of the aircraft.

30 Claims, 5 Drawing Figures

SPRAY BOOM

Aircraft equipped with means for spraying chemicals or liquids upon and over the ground surfaces over which they fly have had a variety of devices available for mounting on an aircraft to accomplish the desired spraying. However, none of them have been able to perform as satisfactorily as desired, and the costs of making same have become progressively more expensive. Some of the problems associated with the spraying devices of the prior art have been: (1) the inability to use different materials or chemicals while on a single flight; (2) the inability to vary the rate of distribution of material in flight; (3) the inability to vary the pattern of spraying; and (4) the substantial drag which the devices placed on the movement of the aircraft, thereby interfering with its speed, rate of acceleration and maximum height at which it could fly and increasing the amount of fuel required, thereby increasing the cost of operation and reducing the length of time that the aircraft could stay in flight without refueling.

It is therefore an object of this invention to provide a novel spraying attachment for an aircraft which is so designed that materials having different physical characteristics, such as liquids, powders, granules or gases can be carried in separate sealed compartments in the boom attachment so that a variety of chemicals or different materials may be sprayed simultaneously or at different times while the aircraft is on a single flight so that the aircraft can handle a variety of different spraying jobs without having to return to its home base for a change of material or for a change of or adjustment of the discharge means to vary the pattern of the material being sprayed. In the past, if different chemicals were to be applied, the aircraft would have to return after spraying one chemical and have the remainder of the contents of the spraying attachment removed, the attachment itself cleaned out and then recharged with a different chemical, with the aircraft then returning to where it was to apply the second type of chemical or going to a new spraying location.

Still another object is to provide a novel spraying attachment which provides an improved control over the rate of discharge of the spray material so that the same or different materials can be applied at selectively different rates.

Still another object is to provide a novel spray attachment which constitutes a single aluminum extrusion which thereby substantially reduces the cost and weight of spray attachments.

Still another object is to provide a novel spray attachment which is aero-dynamically designed so that the air passing around it during flight will assist in lifting the aircraft and it is aero-dynamically designed so as to substantially reduce and minimize the amount of drag caused by the spray attachment.

Still another object is to provide a novel spray attachment having uniquely designed nozzles used in conjunction therewith, which nozzles are so mounted in combination with the attachment as to minimize any drag which might otherwise be related thereto and which are so designed as to minimize the chances of said nozzles becoming plugged during use.

Still another object is to provide a unique control system for the spray attachment which provides inflight variations not previously available in spray attachments which require individual manual adjustment on the ground before take-off and which were incapable of any variation during flight.

Still another object is to provide a novel spray attachment which is capable of having the spray pattern selectively varied while in flight to maximize the efficiency and effectiveness of distribution of the material to be sprayed and to provide better control of the patterns so that material will not be sprayed on areas it should not be sprayed in the sense that if sprayed, damage would result, and to prevent spraying on areas where it is undesirable to spray in the sense that to do so results in a waste of material because the area sprayed does not need it.

These and other objects and advantages will be readily apparent from a review of the drawings attached hereto and a reading of the following description which relates to said drawings and in which drawings.

Figure 1:
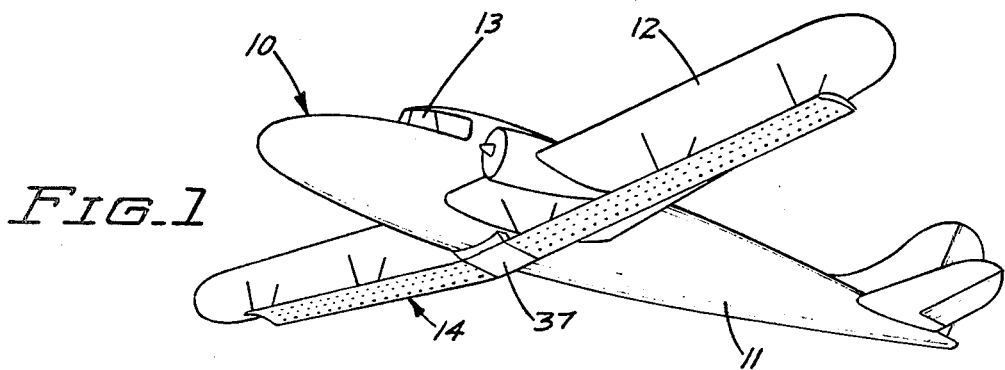
FIG. 1 is a perspective view of an airplane having a spray attachment constituting one preferred embodiment of this invention attached thereto.

Referring now to the drawings, an airplane 10 is shown, which airplane can be of any type, make or style suitable for use in spraying. Said airplane includes a fuselage 11 and wings 12 and a cockpit or cabin 13 where the pilot sits and where the controls for the aircraft, including the controls for the spraying attachment hereinafter to be described are preferably located.

The spray attachment is indicated in its entirety by the numeral 14, which spray attachment is mounted beneath the wings and is so designed that material can be sprayed from the full length of said attachment and substantially equally on either side of the fuselage, with that portion of the attachment on one side of the fuselage preferably being separate and independent from that portion on the other side of the fuselage so that, where desired spraying can be accomplished only from one side of the aircraft.

The spray attachment includes an arcuately convexly curved upper surface or wall 15 and an arcuately concavely curved lower surface or wall 16. The two surfaces 15 and 16 merge forwardly in a rounded tapered end 17 and rearwardly in a sharply tapered manner terminating in the training point or edge 18.

Figure 3:
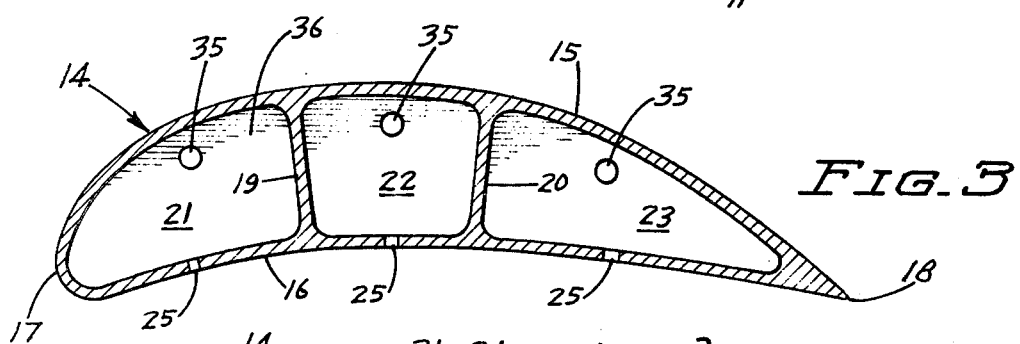
FIG. 3 is a cross sectional view of the attachment of FIG. 1 on an enlarged scale taken approximately along the line 3—3 of FIG. 2.
Figure 2:
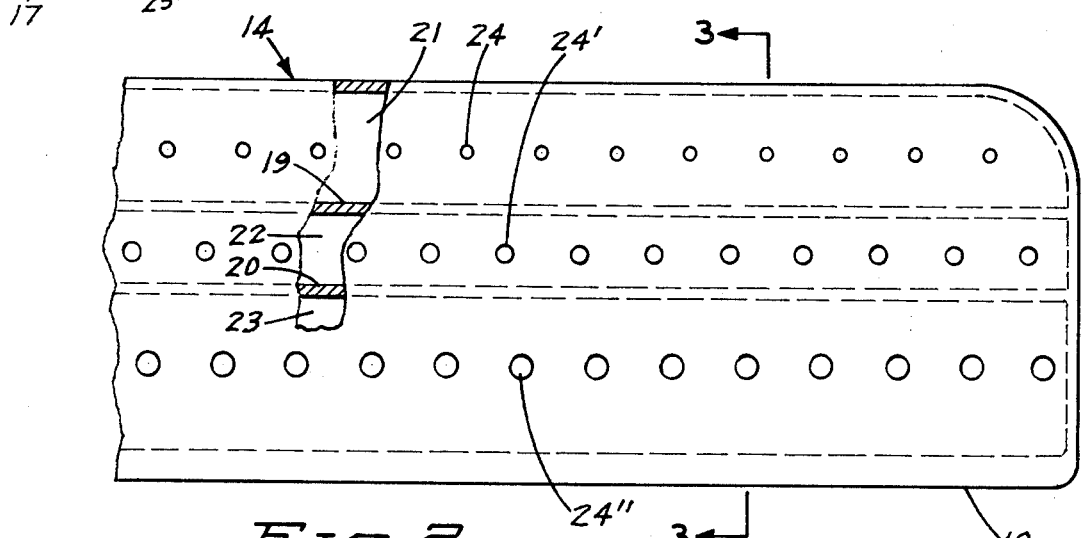
FIG. 2 is a bottom plan view on an enlarged scale of a portion of the attachment of this invention with portions broken away.

The upper and lower surfaces 15 and 16 are aero-dynamically designed and styled to provide a maximum of lift capability to the aircraft and are thereto designed so that air will pass over in such a fashion as to minimize the drag on the aircraft created by the attachment, and it will be noted that when the attachment is viewed in cross section, such as in FIG. 3, that the cross sectional shape of the boom bears a striking resemblance to the cross sectional design of the wing of an airplane, that is, it has the shape or design of an air foil.

The interior of the spray attachment 14 includes generally upstanding or vertical interior wall sections 19 and 20 respectively which connect the upper and lower walls 15 and 16 and which extend the full length of the attachment and thereby provide three longitudinally extending individual compartments 21, 22 and 23 which are hermetically sealed from one another so that each of them can contain a liquid or a powder or granular material or even a gasiform material if such use were appropriate.

In one preferred form of this invention, the spray attachment 14, in its basic form consisting of the upper and lower wall surfaces 15 and 16 and the interior walls 19 and 20 consist of a single aluminum extrusion so that the entire wall structure is integrally united without requiring any additional procedures such as welding, or drilling, followed by installation of suitable fasteners such as bolts, screws or rivets. The single extrusion is the least expensive of the known methods available for fabrication of such a boom, and the aluminum itself provides sufficient strength, combined with a minimum of weight, thereby providing the highest weight to strength ratio available.

Each of the compartments are provided with a series of nozzles 24 which for purposes of this disclosure are identical and the description of one will apply to all. The nozzles for each compartment preferably cumulatively extend substantially the full length of the compartment so that material can be effectively sprayed from that compartment in a uniform distribution pattern across the entire length of the compartment or spray attachment. The nozzles in actual use may vary for any given compartment, and the nozzles of one compartment may be different from those of another compartment, all within the needs of the particular user.

Figure 4:
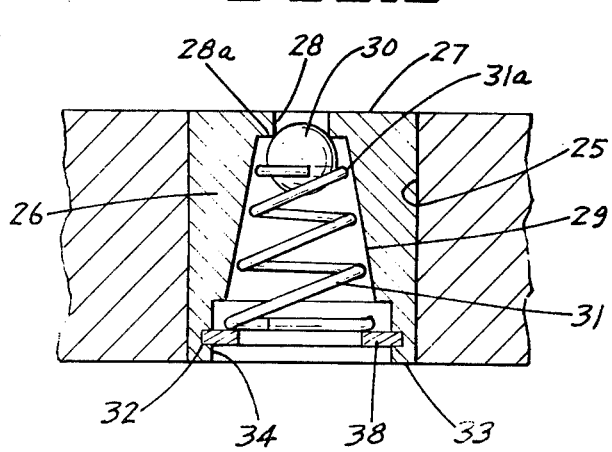
FIG. 4 is a cross sectional view on an enlarged scale of one of the nozzles of this invention.

Each of the individual nozzles is installed in an opening 25 formed in the bottom wall 16, which opening may be formed in any suitable manner such as by drilling. Each of the nozzles (best seen in FIG. 4) includes a cylindrical body portion 26 installed in the opening 25. The upper face 27 of said cylindrical nozzle body has an opening 28 formed therein, which in the form illustrated, is circular in shape, said opening 28 communicating with a tapered hollow interior portion 29, through which opening 28 the material to be sprayed passes from its respective compartment in the spraying attachment to said hollow interior 29. A spherical ball valve 30 is mounted in said hollow interior 29 and seats itself upon the annular edge or shoulder 28a of opening 28 to seal or close said upper opening 28 and prevent escape of material therefrom, said ball valve 30 being normally in a closed position.

The ball valve 30 is continuously biased towards its normal closed position and towards its sealing engagement with said upper opening 28 by means of a tapered helically coiled spring 31 having substantially the same shape or exterior configuration as the hollow interior 29 with one end 31a (the smaller end in this case) directly engaging the ball valve 30, the other larger end of the spring being seated in an annular groove 32 in the lower end of the cylindrical body 26 in a snap fit in manually removable fashion so as to hold the spring in the correct position in the nozzle body.

The lower end of the cylindrical nozzle body 26 has a lower face 33 which is preferably mounted flush with the lower surface 16 of the attachment to eliminate drag.

Said body also includes a large circular opening 34 which may be termed a discharge opening and through which the material to be sprayed is finally discharged onto the ground surface over which the aircraft is flying. The nozzles may be mounted in their respective nozzle openings 25 by any suitable means, such as by the use of an epoxy adhesive. It will also be noted that the nozzles are so designed that the ball valve and spring can be easily installed in or removed therefrom either during the original assembly of the nozzle, or after usage, to facilitate cleaning and, where necessary, replacement of parts. The spring is preferably formed of stainless steel as well as the ball itself to minimize corrosion thereof from the various chemicals to which it will be exposed.

In one preferred version, the ball valve is 0.200 inches in diameter. The spring in one preferred form for use with a ball valve of the aforementioned dimension is one in which the outside diameter of the largest convolution has a diameter on the order of 0.500 inches tapering down to the small end which has an inside diameter slightly under 0.200 inches so that it can engage and press against the ball valve 30. That same spring in one preferred embodiment has an installed compressed length of approximately 0.350 inches and when compressed delivers 0.027 pounds of force or pressure.

The nozzles are designed to be opened by means of an increase in air pressure in the interior of the compartment with which it communicates, with the interior pressure obviously having to be greater than the force exerted by the spring 31 to move the ball valve off its seat and enable the material in the compartment to pass through the upper opening 28.

It will be understood that although the spray boom of this invention has particular applicability to use with an airplane, it also has applicability in other types of spraying operations, including those where the boom is supported by some form of ground traversing machine, such as a tractor.

The material to be sprayed may be admitted to the respective compartments through openings 35 provided in the end wall 36 of each such compartment.

In the illustrated version, the end wall 36 abuts with a material hopper 37 carried by the underside of the fuselage, with the openings 36 communicating with said hopper for receiving material therefrom. The hopper in turn may communicate with a reservoir of material within the fuselage.

The controls for admitting the material to the compartments 21, 22 and 23 form no part of this invention, nor does the means for controlling the pressure within the compartments to control the opening and closing of the ball valves 30.

An example of one preferred form of this invention, is a spray boom which is approximately 5.25 inches from front to rear (width) and approximately 1.4 inches high, with a wall thickness of approximately 0.080 inches.

Different chemicals may be used in each of the compartments on a given flight. Thus, chemical A may be in compartment 21, chemical B in compartment 22, and chemical C in compartment 23 when the plane takes off.

The controls may be such that each compartment has the same or a different rate of discharge, such as $x$ gallons per minute for compartment 21, $y$ gallons per minute for compartment 22 and $z$ gallons per minute for compartment 23.

The cross sectional design of the boom is intentionally shaped and dimensioned to provide the effect of an air foil which will provide maximum lift for the plane, functioning in the same manner as a wing would, and the boom is also designed to minimize the amount of drag it will cause in flight by reducing the amount of friction created by air passing thereover and therearound.

It should also be understood that one of the important advantages of this invention is the flexibility in use and operation that it provides the operator. With three different compartments, three different chemicals can be carried at one time, or the same chemical in different character or size can be carried in the respective compartments.

The separate compartments also permit the use of different types of nozzles which can discharge at different rates or provide a different character of discharge therefrom, such as in the size of the droplets (if the material is a liquid). The nozzles in each compartment can also be located in a special arrangement with respect to the nozzles in the other compartments so as to accomplish some special result, such as overlapping strips of sprayed materials, or spraying in bands of different widths or patterns, etc. The independent compartments and nozzles also permit the use of different types of controls for each compartment, if such is desirable to accomplish certain end results.

It is also to be appreciated that each of the compartments 21 — 22 — 23 is hermetically sealed off from the others, so that there will be no intermingling of the contents of the respective compartments. Also, the simple ability to operate the nozzles of each compartment independently of the others provide the operator with at least three potential in-flight variations, as compared with presently available systems where the plane must land and have the nozzles manually adjusted if any variation in rate or pattern of distribution is desired.

It will be noted that the spring 31 is held in place by an annular retaining or snap ring 38 which seats in an annular groove 32 in the body 26.

Figure 5:
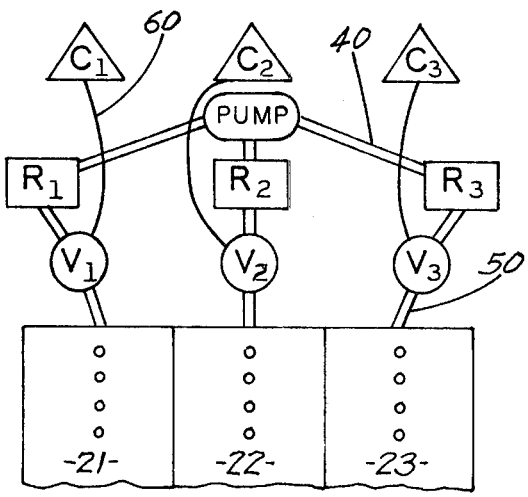
FIG. 5 is a schematic diagram of one preferred control system.

FIG. 5 schematically illustrates one preferred form of control system for successfully operating and controlling the movement of material into and out of the separate compartments 21 to 23 inclusive, of the disclosed spray boom. In FIG. 5, separate reservoirs R1, R2, and R3 are provided for housing the individual material to be delivered to the spray boom compartments 21 to 23 inclusive respectively for ultimate spraying on the ground. These reservoirs may be individual in nature or they may comprise separate compartments of a common hopper or reservoir such as hopper 37, previously mentioned.

Since the ball valves 30 which control the discharge of material from the spray compartments 21 to 23 inclusive open and close in response to changes in air pressure within their respective compartments, it is necessary to provide means for providing pneumatic pressure such as the common pump shown in FIG. 5, which pump is individually connected with each of the reservoirs by means of ducts 40 so as to pressurize each of them to whatever predetermined pressure is decided to be most desirable. Each of the reservoirs is, in turn, connected by means of suitable piping or conduit 50 with its respective spray compartments in the spray boom with normally closed valves V1, V2 and V3 individually interposed between the reservoir and their respective spray compartment. The valves V1–V3 inclusive are selectively opened and closed by means of a control member in the cockpit shown in the illustration as C1, C2, and C3, said controls and valves being connected by a control line 60. Thus, for example, when the pilot actuates control C1 and thereby opens valve V1, the pressurized material in reservoir R1 immediately flows into spray chamber 21 of the spray boom under pressure in excess of that then existing in the spray compartment. When the pressure in spray compartment 21 increases to a predetermined figure, the individual spray nozzles open and discharge material from the compartment through the nozzles onto the ground below. The same procedure applies to each of the other spray compartments and their respective reservoirs, valves, and controls.

It will, of course, be understood that various changes may be made in the various parts and dimensions referred to and illustrated herein, without departing from the scope of this invention.

The embodiments of the invention in which an exclusive property or privilege is claimed are defined as follows:

1. A device for spraying material into the atmosphere comprising: body means having a single wall structure surrounding a plurality of separate compartments, separate means for admitting material to each of said compartments, and means mounted on the body means for discharging material from each of said compartments to the surrounding atmosphere, said means for for discharging material including separate discharge openings in the body means, said discharge openings of one compartment being arranged with respect to the discharge openings of a second compartment so that the discharge openings are in a staggered relationship whereby material discharged from the openings of one compartment fall on an area not covered by the material discharged from the openings of the second compartment.

2. The device of claim 1 wherein: said wall structure is an elongated member having an upper wall and a lower wall and three longitudinal compartments located between said walls, said upper wall having a convex curved shape in cross section and said lower wall having a concave curved shape in cross section, said means for discharging the material being mounted on said lower wall.

3. The device of claim 1 including: nozzle means for discharging material from each of said compartments, and means for opening and closing said nozzle means.

4. The device of claim 1 wherein: said wall structure has an exterior design in the shape of an air foil.

5. The device of claim 1 wherein: said means for discharging material includes nozzle means for selectively discharging material from each of said compartments,
   and means for selectively opening and closing the nozzles of said compartments.

6. The device of claim 1, wherein: said wall structure has a normally upper and a normally lower surface, and wherein said upper surface is convexly curved.

7. The device of claim 1 wherein: the wall structure has a normally upper and a normally lower surface and the bottom surface of said body portion is concavely curved.

8. The device of claim 1 wherein: said wall structure has a normally upper and a normally lower surface and, wherein said lower surface is concavely curved, and said upper surface is convexly curved.

9. The device of claim 1 wherein: said wall structure includes a normally upper surface and a normally lower surface, and wherein one of said surfaces is concavely curved.

10. The device of claim 1 wherein: said wall structure includes a normally upper surface and a normally lower surface, and wherein one of said surfaces is convexly curved.

11. A device for spraying material into the atmosphere comprising: body means having a wall structure surrounding a plurality of separate compartments, separate means for admitting material to each of said compartments, means mounted on the body means for discharging material from each of said compartments to the surrounding atmosphere, pressure responsive nozzle means for discharging material from each of said compartments, and means for opening and closing said nozzle menas including means for varying the pressure on said nozzle means, said nozzle means opening and closing in accordance with predetermined pressure levels.

12. The device of claim 11 wherein: said nozzle means includes a valve seat, a ball engageable with said seat for closing said opening, and spring means continuously biasing said ball towards engagement with said seat.

13. The device of claim 11 wherein: said nozzle means is carried by said wall structure and communicates with said atmosphere, said nozzle means having no part thereof extending beyond said outer surface.

14. A device for spraying material into the atmosphere comprising: body means having a wall structure surrounding a plurality of separate compartments, separate means for admitting material to each of said compartments, and means mounted on the body means for discharging material from each of said compartments to the surrounding atmosphere, said body means having a bottom wall, an opening formed in said bottom wall, a nozzle body installed in said opening, said nozzle body having an opening formed therein and extending completely therethrough and having first and second end portions, one end portion communicating with one of said compartments, the other end portion communicating with the atmosphere surrounding said body structure, a portion of said opening including a portion of said nozzle body shaped to form a valve seat, a ball adapted to engage said valve seat to close said opening, and spring means biasing said ball towards a closed position.

15. The device of claim 14 wherein: said opening is generally conical in cross section, with the smaller end located adjacent said compartment and the larger end located adjacent said outside atmosphere, said spring being helical and conically shaped, with said spring being installed in the conical portion of said opening and conically oriented in the same direction.

16. A device for spraying material into the atmosphere comprising: body means having a wall structure surrounding a plurality of separate compartments, separate means for admitting material to each of said compartments, and means mounted on the body means for discharging material from each of said compartments to the surrounding atmosphere, a powered vehicle, said body means extending generally laterally from said vehicle, reservoir means carried by said vehicle, means connecting said compartments with said reservoir means for the transfer of material from the reservoir means to said compartments, said vehicle having a location normally occupied by an operator during operation of said vehicle, and means operable by said operator while at said location for controlling said transfer of material.

17. The device of claim 1 including: an airplane,
said body means comprising two sections extending laterally from opposite sides of the fuselage of said airplane,
said compartments extending generally laterally of said fuselage in generally parallel relationship to each other.

18. A device for spraying material into the atmosphere comprising: body means having a wall structure surrounding a plurality of separate compartments, separate means for admitting material to each of said compartments, means mounted on the body means for discharging material from each of said compartments to the surrounding atmosphere, an airplane, said body means comprising two sections extending laterally from opposite sides of the fuselage of said airplane, said compartments extending generally laterally of said fuselage in general parallel relationship to each other, reservoir means for said material carried by said airplane, and first and second control means operable from the cockpit of the airplane, said first control means being adapted to control the transfer of material from said reservoir means to said compartments, said second control means being adapted to control the discharge of material from said compartments.

19. The device of claim 19 wherein: said body means has the exterior shape of an air foil to assist in lifting the airplane, and the interior of the body means includes three compartments extending generally laterally from the fuselage of the airplane in substantially parallel juxtaposed relationship to each other.

20. A spraying device comprising in combination with an airplane having a fuselage and a cockpit for a pilot: body means supported by said airplane defining a plurality of compartments, at least two of said compartments being sealed from one another whereby material cannot move from one of said compartments to the other, said body means having a normally upper and a normally lower surface, said lower surface being concavely curved, and said upper surface being convexly curved, said device having an exterior design in the shape of an air foil which is adapted to assist in lifting the airplane during forward movement thereof, pressure responsive nozzle means for selectively discharging material from each of said compartments and from said body means to the surrounding atmosphere, means operable from said cockpit for opening and closing said nozzle means including means operable from said cockpit for varying the pressure on said nozzle means.

21. The device of claim 20 wherein: said nozzle means being in communication with their respective compartment and adapted to open and close in response to the air pressure in said compartment.

22. The device of claim 20 wherein: said nozzle means have material discharge openings in said lower surface of the body means, said discharge openings of one compartent being arranged with respect to the discharge openings of a second compartment so that the openings are in a staggered relationship whereby material discharged from the openings of one compartment will fall on an area not covered by the material discharged from the openings of the second compartment.

23. The device of claim 20 wherein: each of said nozzle means includes a valve seat surrounding an opening, a ball engageable with said seat for closing and opening, and spring means continuously biasing said ball towards engagement with said seat, said opening being in communication with the interior of one of said compartments, said ball being exposed to the air pressure in said compartment and adapted to disengage itself from said valve seat when the air pressure in said compartment exceeds a predetermined amount.

24. The device of claim 20 including reservoir means carried by said airplane, said compartments being in communication with said reservoir means for the transfer of material from the reservoir means to said compartments, and means operable by said pilot while in said cockpit for controlling said transfer of material.

25. A device for spraying material into the atmosphere comprising: body means having a plurality of separate compartments, means for discharging material from the compartments into the atmosphere, individual reservoir means for each of said compartments, means for conveying material from said reservoir means to its respective compartment, valve means for controlling the movement of said material from said reservoir means to its respective compartment, and control means for selectively opening and closing each of said valve means.

26. The device of claim 25 wherein: said means for conveying said material includes pump means for conveying the material from said reservoir means to its respective compartment under pressure.

27. The device of claim 26 including: a common pump for each of said reservoir means.

28. The device of claim 26 wherein said device is mounted upon an airplane, and wherein said pump means, reservoir means, valve means and control means are supported by said airplane, individual valve means interposed between each of said reservoir means and it respective compartment, and individual control means located in the cockpit of said airplane and manually operable by the pilot in his normal operational position in said cockpit, the pressure provided by said pump means causing the material to move from its respective reservoir to its respective compartment when the valve means for said reservoir is opened, said nozzle means in each compartment opening in response to increased pressure in its compartment provided by said pump means for discharging the material from said compartment.

29. The device of claim 25 wherein: said body means is an elongated member having an upper wall and a lower wall and three longitudinal compartments located between said walls, said upper wall having a convex curved shape in cross section and said lower wall having a concave curved shape in cross section, said means for discharging material being mounted on said lower wall.

30. The device of claim 25 wherein: said means for discharging material includes separate discharge openings in the body means, said discharge openings of one compartment being arranged with respect to the discharge openings of the second compartment so that the discharge openings are in a staggered relationship whereby material discharged from the openings of one compartment will fall on an area not covered by the material discharged from the openings of the second compartment.

* * * * *